(12) United States Patent
Shah et al.

(10) Patent No.: US 12,311,699 B2
(45) Date of Patent: May 27, 2025

(54) WHEEL END ASSEMBLY

(71) Applicant: ArvinMeritor Technology, LLC, Troy, MI (US)

(72) Inventors: Deval H. Shah, Troy, MI (US); Jeffrey Audet, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 428 days.

(21) Appl. No.: 17/852,678

(22) Filed: Jun. 29, 2022

(65) Prior Publication Data

US 2024/0001710 A1 Jan. 4, 2024

(51) Int. Cl.
*B60B 35/12* (2006.01)
*B60B 7/00* (2006.01)
*B60B 27/00* (2006.01)
*B60K 17/04* (2006.01)
*F16H 1/28* (2006.01)

(52) U.S. Cl.
CPC .......... *B60B 35/125* (2013.01); *B60B 7/0013* (2013.01); *B60B 27/0021* (2013.01); *B60K 17/046* (2013.01); *F16H 1/2854* (2013.01)

(58) Field of Classification Search
CPC . B60B 35/125; B60B 7/0013; B60B 27/0021; B60B 27/00; B60K 17/046; B60K 17/043; F16H 1/2854; F16H 2048/085
See application file for complete search history.

(56) References Cited

U.S. PATENT DOCUMENTS

| | | | |
|---|---|---|---|
| 3,362,258 A | 1/1968 | Thornton | |
| 4,959,043 A * | 9/1990 | Klotz | F16H 48/08 475/230 |
| 5,897,453 A * | 4/1999 | Mimura | F16D 7/007 475/230 |
| 6,981,929 B2 * | 1/2006 | Janiszewski | F16H 48/08 74/606 R |
| 9,109,635 B2 | 8/2015 | Boothby et al. | |
| 9,315,077 B2 | 4/2016 | Flory et al. | |
| 9,518,642 B1 | 12/2016 | Hirao | |
| 10,316,949 B2 | 6/2019 | Tiziani et al. | |
| 10,513,146 B2 * | 12/2019 | Eschenburg | B60K 17/02 |
| 2002/0112802 A1 * | 8/2002 | D'Amico | B60C 23/0039 152/415 |
| 2022/0048318 A1 | 2/2022 | Shah et al. | |

FOREIGN PATENT DOCUMENTS

DE 1430473 A1 10/1968
DE 3841234 A 8/1989

OTHER PUBLICATIONS

Extended European Search Report dated Aug. 31, 2023 for related European Appln. No. 23174448.3; 7 Pages.

* cited by examiner

*Primary Examiner* — Justin Holmes
(74) *Attorney, Agent, or Firm* — Jordan IP Law, LLC

(57) ABSTRACT

A wheel end assembly that includes a hub, a hub cap, first and second spider retainers, and a spider having a spider shaft. The hub and the hub cap cooperate to define an internal cavity. The first and second spider retainers are disposed in the internal cavity and cooperate to define a spider shaft hole. The spider shaft is received in the spider shaft hole.

20 Claims, 4 Drawing Sheets

WHEEL END ASSEMBLY

TECHNICAL FIELD

The invention relates to a wheel end assembly for a vehicle.

BACKGROUND

A bevel gear wheel end assembly is disclosed in U.S. Pat. No. 10,316,949.

SUMMARY

In at least one embodiment a wheel end assembly is provided. The wheel end assembly includes a hub, a hub cap, a first spider retainer, a second spider retainer, and a spider. The hub is rotatable about an axis. The hub cap is mounted to the hub. The hub and the hub cap cooperate to define an internal cavity. The first spider retainer and the second spider retainer encircle the axis and are disposed in the internal cavity. The first spider retainer in the second spider retainer cooperate to define a spider shaft hole. The spider has a spider shaft that is disposed between the first spider retainer and the second spider retainer. The spider shaft is received in the spider shaft hole. An end surface of the spider shaft that faces away from the axis is disposed inside the internal cavity.

The first spider retainer may be encircled by the hub cap. The first spider retainer may engage the hub cap. The first spider retainer may be fastened to the hub cap such that the hub cap and the first spider retainer are rotatable together about the axis.

The second spider retainer may be encircled by the hub. The second spider retainer may engage the hub. The second spider retainer may be fastened to the hub such that the hub and the second spider retainer are rotatable together about the axis.

The first spider retainer may be fastened to the second spider retainer such that the first spider retainer and the second spider retainer rotatable together about the axis. The hub cap, the first spider retainer, the second spider retainer, and the hub may be fastened together and may be rotatable together about the axis. The hub cap, the first spider retainer, the second spider retainer, and the hub may be fastened together with a fastener that extends through the hub cap, through the first spider retainer, through the second spider retainer, and into the hub.

The first spider retainer and the second spider retainer may encircle a gear reduction unit. The gear reduction unit may include a pinion gear. The pinion gear may be rotatable about the spider shaft. The first spider retainer and the second spider retainer may encircle the pinion gear.

A thrust washer may encircle the spider shaft. A washer may encircle the spider shaft. The thrust washer may extend from the pinion gear to the washer. The washer may extend from the thrust washer to the first spider retainer and the second spider retainer.

A seal may extend from the hub to the hub cap. The seal may encircle the axis.

In at least one embodiment, a wheel end assembly is provided. The wheel end assembly includes a hub, a hub cap, a first spider retainer, a second spider retainer, and a spider. The hub is rotatable about an axis. The hub cap engages the hub. The hub and the hub cap cooperate to define an internal cavity. The first spider retainer is disposed in the internal cavity and engages the hub cap. The second spider retainer is disposed in the internal cavity and engages the hub. The first spider retainer and the second spider retainer are sandwiched between the hub and the hub cap. The first spider retainer and the second spider retainer cooperate to define a spider shaft hole. The spider has a spider shaft. The spider shaft is sandwiched between the first spider retainer and the second spider retainer and is received in the spider shaft hole. The spider, the first spider retainer, and the second spider retainer are completely disposed inside the internal cavity.

The hub may have a hub step that faces toward the second spider retainer and the hub cap. The second spider retainer may engage the hub step.

The hub may have a hub flange. The hub flange may encircle the axis. The hub flange may extend to a hub flange end surface. The second spider retainer may engage the hub flange.

The hub cap may have a hub cap wall. The hub cap wall may face toward the first spider retainer and the hub. The first spider retainer may engage the hub cap wall.

The hub cap may have a hub cap flange. The hub cap flange may encircle the axis. The hub cap flange may have a hub cap flange end surface. The first spider retainer may engage the hub cap flange.

A seal may extend from the hub cap flange end surface to the hub flange end surface.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
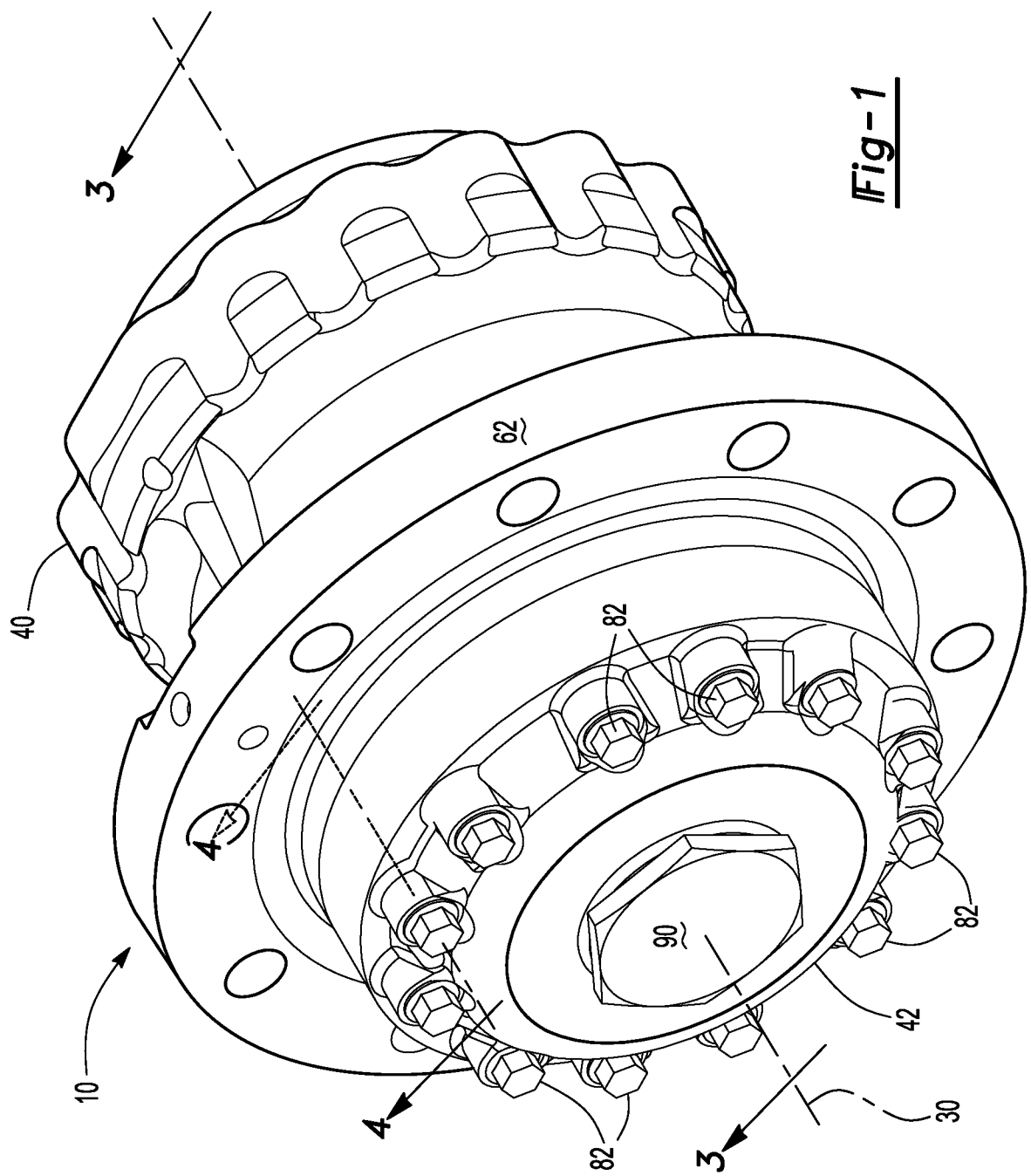
FIG. 1 is a perspective view of an example of a wheel end assembly.

Referring to FIG. 1, an example of a wheel end assembly 10 is shown. The wheel end assembly 10 may be provided with a vehicle like a truck, bus, farm equipment, mining equipment, military transport or weaponry vehicle, or cargo loading equipment for land, air, or marine vessels. The vehicle may include a trailer for transporting cargo in one or more embodiments.

Figure 3:
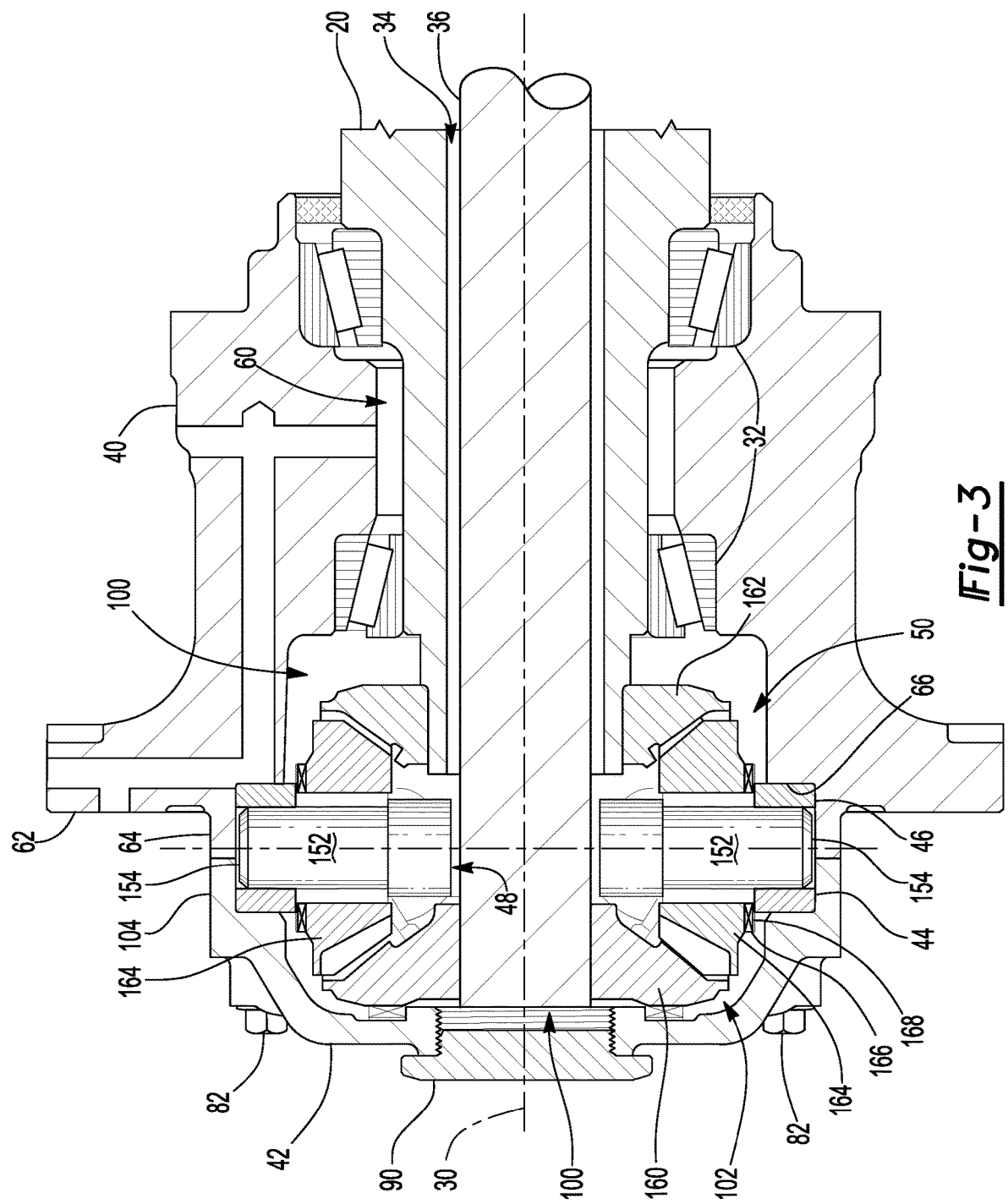
FIG. 3 is a section view along section line 3-3.

The wheel end assembly 10 may be configured to support a vehicle wheel. The wheel end assembly 10 may be provided in a steerable configuration or a non-steerable configuration. In a steerable configuration, the wheel end assembly 10 may be mounted to a steerable structural component, such as a steering knuckle. In a non-steerable configuration, the wheel end assembly 10 may be mounted to a non-steerable structural component, such as a non-rotatable knuckle or an axle housing of an axle assembly. As an example, the wheel end assembly may be rotatably disposed on a spindle 20, an example of which is best shown in FIG. 3. The spindle 20 may be provided with the structural component and may be fixedly positioned with respect to the structural component. The spindle 20 may extend along or around an axis 30 and may support one or more wheel bearings 32. In addition, the spindle 20 may define a spindle hole 34 through which an axle shaft 36 may extend.

The axle shaft 36 may be rotatable about the axis 30 with respect to the spindle 20. The axle shaft 36 may provide torque to the wheel end assembly 10. For instance, the axle shaft 36 may be operatively connected at a first end to a vehicle drivetrain component, such as a differential or vehicle power source, and may be coupled to or operatively connected to the wheel end assembly at a second end.

Figure 2:
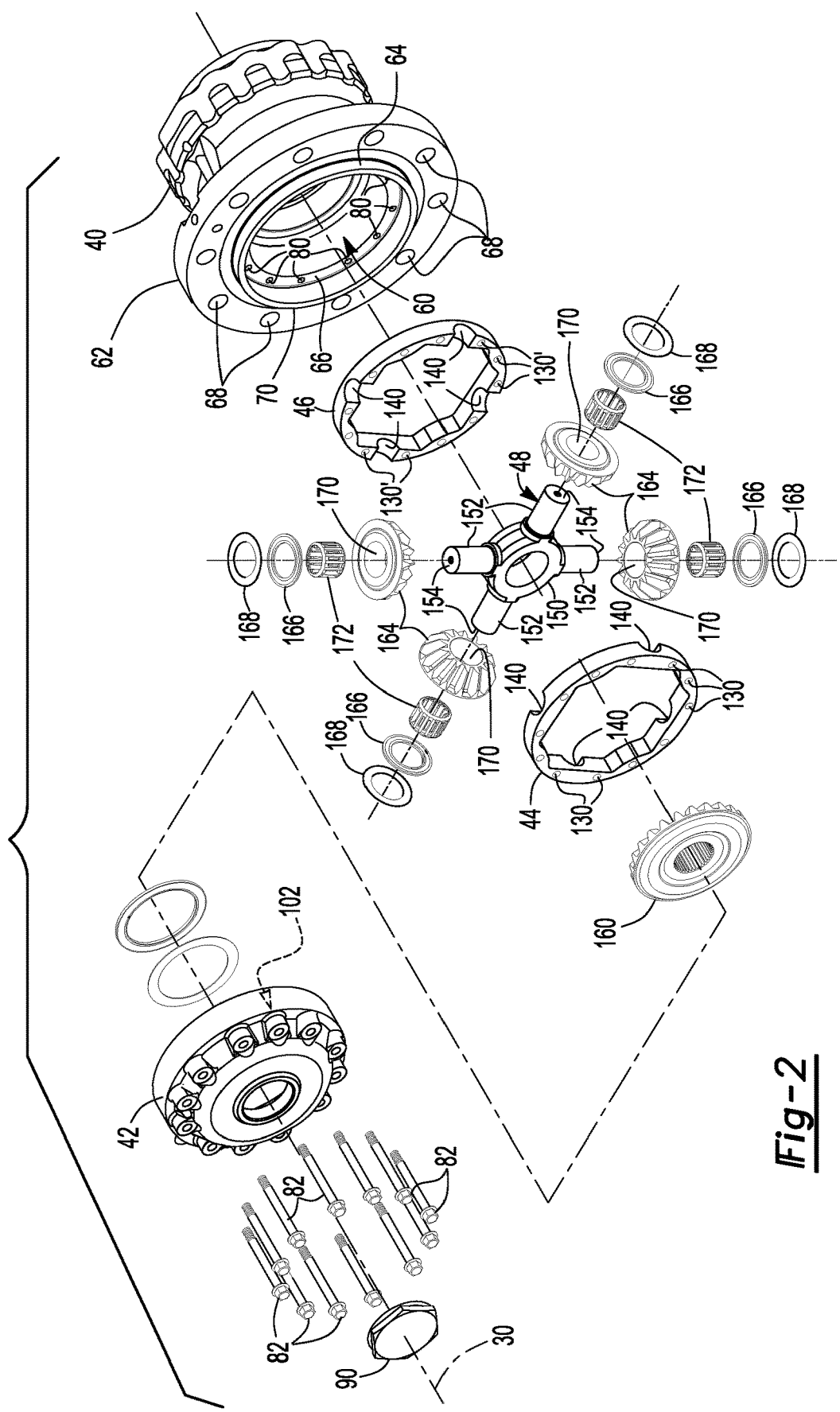
FIG. 2 is an exploded view of the wheel end assembly rotatably supported on a spindle.
Figure 4:
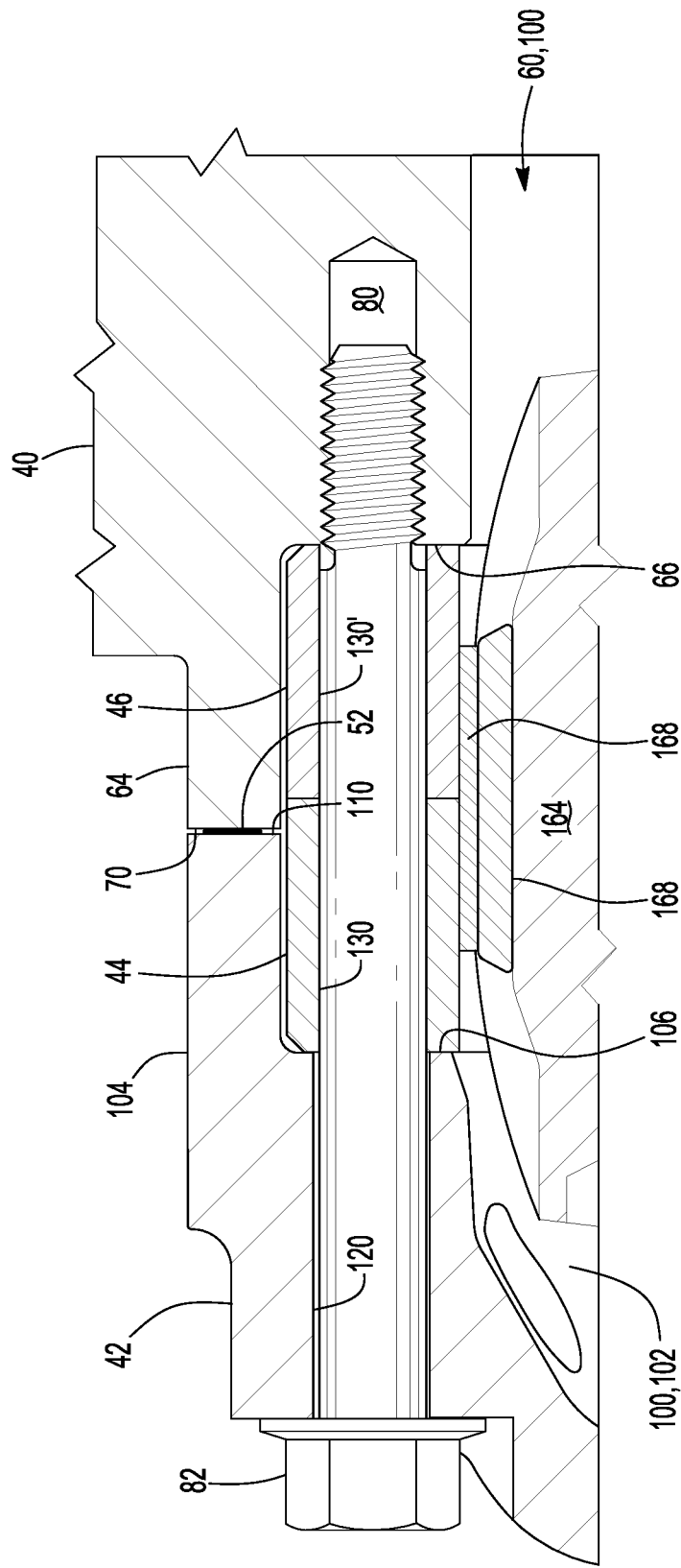
FIG. 4 is a section view along section line 4-4.

In at least one configuration and as is best shown with reference to FIGS. 2 and 3, the wheel end assembly 10 may include a hub 40, hub cap 42, a first spider retainer 44, a second spider retainer 46, and a spider 48. The spider 48 may be part of a gear reduction unit 50, which is best shown in FIG. 3. The wheel end assembly 10 may also include a seal 52, which is best shown in FIG. 4.

Referring to FIGS. 1-3, the hub 40 may be rotatable about the axis 30 with respect to the spindle 20. In addition, the hub 40 may be configured to facilitate mounting of the wheel. The hub 40 may be operatively connected to an axle shaft 36. In at least one configuration and as is best shown in FIGS. 2 and 3, the hub 40 may include a hub cavity 60, a wheel mounting flange 62, a hub flange 64, a hub step 66, or combinations thereof.

The hub cavity 60 may extend around the axis 30. The hub cavity 60 may receive at least a portion of various components of the wheel end assembly 10, such as the spindle 20, the wheel bearings 32, and the gear reduction unit 50.

The wheel mounting flange 62 may facilitate mounting of the wheel. For example, the wheel mounting flange 62 may extend away from the axis 30 and may include a set of mounting fastener holes 68 that may each receive a lug bolt. A lug bolt may extend through a corresponding hole in the wheel. A lug nut may be threaded onto a lug bolt to secure the wheel to the hub 40.

The hub flange 64, if provided, may protrude axially with respect to the wheel mounting flange 62 in a direction that extends towards the hub cap 42. The hub flange 64 may be disposed closer to the axis 30 than the wheel mounting flange 62. In at least one configuration, the hub flange 64 may encircle the axis 30. The hub flange 64 may have a hub flange end surface 70, which is best shown in FIG. 4.

The hub flange end surface 70 may be disposed at a distal end of the hub flange 64. The hub flange end surface 70 may face toward the hub cap 42 and may engage the hub cap 42. The hub flange 64 may extend from the hub flange end surface 70 to the hub step 66.

Referring to FIGS. 3 and 4, the hub step 66 may be disposed closer to the axis 30 than the hub flange 64. For instance, the hub step 66 may encircle the axis 30 and may extend from the hub flange 64 toward the axis 30. The hub step 66 may face toward the hub cap 42 and the second spider retainer 46. In addition, the hub step 66 may contact or engage the second spider retainer 46. The hub step 66 and the hub flange end surface 70 may be axially offset. For instance, the hub step 66 may be positioned along the axis 30 further from the hub cap 42 than the hub flange end surface 70. In at least one configuration, the hub step 66 may be disposed substantially perpendicular to the axis 30 and substantially parallel to the hub flange end surface 70. The term "substantially perpendicular" is used herein to designate features or axes that are the same as or very close to perpendicular and includes features that are within ±3° of being perpendicular each other. The term "substantially parallel" as used herein means the same as or very close to parallel and includes features or axes that are within ±3° of being parallel each other. In at least one configuration and as is best shown in FIG. 2, a plurality of fastener holes 80 may be provided with the hub step 66.

A fastener hole 80 may receive a fastener 82 that couples the hub cap 42, the first spider retainer 44, the second spider retainer 46, or combinations thereof to the hub 40. The fastener 82 may have any suitable configuration. For instance, the fastener 82 configured as a threaded fastener such as a bolt, a threaded shank, a pin, or combinations thereof.

Referring to FIGS. 1-3, the hub cap 42 may be mounted to the hub 40. For example, the hub cap 42 may engage a side or surface of the hub 40 that faces toward the hub cap 42, such as the hub flange end surface 70. In at least one configuration, the hub cap 42 may include an end cap that may cover or enclose an access hole in the hub cap 42.

Referring to FIGS. 3 and 4, the hub cap 42 may enclose an outboard end of the hub cavity 60. As such, the hub 40 and the hub cap 42 may cooperate to define an internal cavity 100. The internal cavity 100 may include the hub cavity 60 and may also include a hub cap cavity 102 when the hub cap 42 protrudes away from the hub 40, such as is shown in FIG. 3. The hub cap cavity 102 may extend around the axis 30. In at least one configuration, the hub cap cavity 102 may receive various components of the wheel end assembly 10, such as the first spider retainer 44 and the gear reduction unit 50. In at least one configuration, the hub cap 42 may have hub cap flange 104, a hub cap wall 106, or both.

The hub cap flange 104, if provided, may encircle the axis 30 and may protrude axially in a direction that extends toward the hub 40. As is best shown in FIG. 4, the hub cap flange 104 may have a hub cap flange end surface 110.

The hub cap flange end surface 110 may be disposed at a distal end of the hub cap flange 104. The hub cap flange end surface 110 may face toward the hub 40 and may engage the hub 40. For instance, the hub cap flange end surface 110 may engage the hub flange end surface 70. The hub flange 64 may extend from the hub flange end surface 70 to the hub cap wall 106.

The hub cap wall 106 may be disposed closer to the axis 30 than the hub cap flange 104. For instance, the hub cap wall 106 may encircle the axis 30 and may extend from the hub cap flange 104 toward the axis 30. The hub cap wall 106 may face toward the hub 40 and the first spider retainer 44. In addition, the hub cap wall 106 may contact or engage the first spider retainer 44. The hub cap wall 106 and the hub cap flange end surface 110 may be axially offset. For instance, the hub cap wall 106 may be positioned along the axis 30 further from the hub 40 than the hub cap flange end surface 110. In at least one configuration, the hub cap wall 106 may be disposed substantially perpendicular to the axis 30 and substantially parallel to the hub cap flange end surface 110. In at least one configuration, a plurality of fastener holes 120 may extend through the hub cap wall 106. A fastener hole 120 may receive a fastener, such as fastener 82.

Referring primarily to FIGS. 2 and 3, the first spider retainer 44 may help support and retain the spider 48. The first spider retainer 44 may be configured as a ring that may encircle the axis 30. The first spider retainer 44 may also encircle the gear reduction unit 50.

The first spider retainer 44 may be disposed in the internal cavity 100. For instance, the first spider retainer 44 may be completely disposed inside the internal cavity 100 and may engage and may be encircled by the hub 40, hub cap 42, or both. For example, the first spider retainer 44 may be encircled by the hub flange 64, the hub cap flange 104, or both. In addition, an outer side or outside circumferential surface of the first spider retainer 44 may contact or engage the hub flange 64, the hub cap flange 104, or both. The hub cap 42 may inhibit axial movement of the first spider retainer 44. For instance, the hub cap wall 106 may engage a side of the first spider retainer 44 that faces away from the second spider retainer 46.

The first spider retainer 44 may be rotatable about the axis 30 with the second spider retainer 46. In at least one configuration and as is best shown in FIGS. 2 and 4, the first spider retainer 44 may include one or more fastener holes 130. The fastener holes may facilitate installation of a fastener that may couple the first spider retainer 44 to the hub cap 42, the second spider retainer 46, or combinations thereof, such as fastener 82.

The second spider retainer 46 may be a separate component from the first spider retainer 44. The second spider retainer 46 may also help support and retain the spider 48. In at least one configuration, the second spider retainer 46 may be configured as a mirror image of the first spider retainer 44. As such, the second spider retainer 46 may be configured as a ring that may encircle the axis 30. The second spider retainer 46 may also encircle the gear reduction unit 50.

The second spider retainer 46 may be disposed in the internal cavity 100. For instance, the second spider retainer 46 may be completely disposed inside the internal cavity 100 and may engage and may be encircled by the hub 40, the hub cap 42, or both. For example, the second spider retainer 46 may be encircled by the hub flange 64, the hub cap flange 104, or both. In addition, an outer side or outside circumferential surface of the second spider retainer 46 may contact or engage the hub flange 64, the hub cap flange 104, or both. The hub 40 may inhibit axial movement of the second spider retainer 46. For instance, the hub step 66 may engage a side of the second spider retainer 46 that faces away from the first spider retainer 44.

In at least one configuration, the second spider retainer 46 may include one or more fastener holes 130'. The fastener holes 130' may facilitate installation of a fastener, such as fastener 82, that may couple the first spider retainer 44 to the hub 40, the second spider retainer 46, or combinations thereof.

The first spider retainer 44 and the second spider retainer 46 may be sandwiched between the hub 40 and the hub cap 42. In FIG. 3, the first spider retainer 44 and the second spider retainer 46 are located near where the hub 40 and the hub cap 42 meet. However, it is contemplated that the first spider retainer 44 and the second spider retainer 46 may be axially positioned further to the left or to the right from the perspective shown. For instance, the first spider retainer 44 and the second spider retainer 46 could be encircled by the hub cap 42 if positioned further left or further inside the hub cap 42 or could be encircled by the hub 40 if positioned further right or further inside the hub 40 from the perspective shown.

Referring to FIG. 2, the first spider retainer 44 and the second spider retainer 46 may cooperate to define one or more spider shaft holes 140. For instance, the first spider retainer 44 and the second spider retainer 46 may each have at least one recess. The recesses may be aligned with each other and may extend away from each other to define a spider shaft hole 140 when the side of the first spider retainer 44 from which its recesses extend contacts or engages the side of the second spider retainer 46 from which its recesses extend. In the configuration shown in FIG. 2, the recesses are illustrated as having semicircular cross-sectional shapes that cooperate to define a circular spider shaft hole 140. Since FIG. 2 is an exploded view, each recess is labelled as being part of the spider shaft hole 140. In the configuration shown, four pairs of recesses are provided that cooperate to define four spider shaft holes 140; however, it is contemplated that a greater or lesser number of spider shaft holes 140 may be provided.

The hub 40, hub cap 42, first spider retainer 44, and second spider retainer 46 may be fastened such that the hub 40, the hub cap 42, the first spider retainer 44, and the second spider retainer 46 are rotatable together about the axis 30. Such fastening may be accomplished in various ways.

In the configuration shown in FIG. 4, at least one fastener 82 extends through a fastener hole 120 in the hub cap 42, a fastener hole 130 in the first spider retainer 44, a fastener hole 130' in the second spider retainer 46, and into a fastener hole 80 in the hub 40.

As another example, the fastener 82 may extend through the fastener hole 120 in the hub cap 42 and into a fastener hole 80 in the hub 40 without extending through a fastener hole in the first spider retainer 44, the second spider retainer 46, or both. As such, the hub 40 and the hub cap 42 may cooperate to clamp the first spider retainer 44 and the second spider retainer 46 together to inhibit rotation of the first spider retainer 44 and the second spider retainer 46 about the axis 30 with respect to the hub 40 and the hub cap 42. The first spider retainer 44 and the second spider retainer 46 may or may not be secured to each other with a fastener in such a configuration.

It is also contemplated that multiple combinations of fasteners may be employed. For instance, one fastener may secure the hub cap 42 to the first spider retainer 44, another fastener may secure the first spider retainer 44 to the second spider retainer 46, and a third fastener may secure the second spider retainer 46 to the hub 40. As another example, a fastener may secure the hub cap 42, first spider retainer 44, and the second spider retainer 46 while another fastener may secure at least one of the hub cap 42, the first spider retainer 44, and the second spider retainer 46 to the hub 40. Conversely, a fastener may secure the hub 40, the second spider retainer 46, and the first spider retainer 44 while another fastener may secure at least one of the hub 40, the second spider retainer 46, and the first spider retainer 44 to the hub cap 42. Regardless of the number of fasteners or fastening technique employed, the first spider retainer 44 and the second spider retainer 46 may be rotatable together about the axis 30, the hub cap 42 and the first spider retainer 44 may be rotatable together about the axis 30, and the hub 40 and the second spider retainer 46 may be rotatable together about the axis 30.

Referring to FIG. 3, the gear reduction unit 50 may operatively connect the axle shaft 36 to the hub 40. The gear reduction unit 50 may be at least partially disposed in the hub 40 and may transmit torque from the axle shaft 36 to the hub 40. In addition to the spider 48, the gear reduction unit 50 may include a first side gear 160, a second side gear 162, and one or more pinion gears 164. In addition, the gear reduction unit 50 may include one or more thrust washers 166, one or more washers 168, or both.

Referring to FIGS. 2 and 3, the spider 48 may be disposed in the internal cavity 100 and may be axially positioned between the first side gear 160 and the second side gear 162. The spider 48 may be rotatable about the axis 30 with the hub 40, the hub cap 42, the first spider retainer 44, the second spider retainer 46, or combinations thereof. In at least one configuration, the spider 48 may include a spider ring 150 and one or more spider shafts 152.

The spider ring 150 may encircle the axis 30. The spider ring 150 may define a through hole through which the axle shaft 36 may extend.

One or more spider shafts 152 may extend in a direction that extends away from the axis 30. For instance, a spider shaft 152 may extend from the spider ring 150 to an end surface 154 of the spider shaft 152. The end surface 154 may be disposed at an end of the spider shaft 152 that is disposed opposite the spider ring 150. As such, the end surface 154 may face away from the axis 30. A spider shaft 152 may extend between or may be sandwiched between the first spider retainer 44 and the second spider retainer 46. A portion of the spider shaft 152 that is located near the end surface 154 may be received in a spider shaft hole 140. The spider 48 and its end surface 154 may be encircled by the hub 40, the hub cap 42, or both. The spider 48 and the end surface 154 may be received inside the internal cavity 100. As such, the spider 48 may be completely disposed inside the internal cavity 100 and may not be disposed in a spider shaft hole that extends to the exterior of the wheel end assembly 10.

The first side gear 160 may be disposed inside the internal cavity 100. In addition, the first side gear 160 may be disposed further outboard or closer to the hub cap 42 than the second side gear 162. The first side gear 160 may be fixedly disposed on the axle shaft 36. For instance, the first side gear 160 may have a hole that may receive the axle shaft 36 such that the first side gear 160 may rotate with the axle shaft 36. The first side gear 160 may be coupled to the axle shaft 36 in any suitable manner. For example, the first side gear 160 may be fastened to the axle shaft 36 with a fastener or may have a spline that mates with a corresponding spline on the axle shaft 36 such that the first side gear 160 may not rotate with respect to the axle shaft 36. The first side gear 160 may also have a set of teeth that may face toward and may be spaced apart from the spider 48. The set of teeth that may be arranged around the axis 30 and may mate or mesh with teeth on one or more pinion gears 164.

The second side gear 162 may also be disposed inside the internal cavity 100. The second side gear 162 may be disposed on an opposite side of the spider 48 with respect to the first side gear 160. The second side gear 162 may be fixedly disposed on the spindle 20 in any suitable manner. For instance, the second side gear 162 may be fastened to the spindle 20 with a fastener or may have a hole and a spline that mates with a corresponding spline of the spindle 20 such that the second side gear 162 may not rotate with respect to the spindle 20. The second side gear 162 may also have a set of teeth that may face toward and may be spaced apart from the spider 48. The set of teeth may be arranged around the axis 30 and may mate or mesh with teeth on one or more pinion gears 164.

One or more pinion gears 164 may be disposed in the internal cavity 100. A pinion gear 164 may be rotatably disposed on a corresponding spider shaft 152. For example, each pinion gear 164 may have a pinion gear hole 170 that may receive a corresponding spider shaft 152. Optionally, a bearing 172 may be disposed in the pinion gear hole 170 between the spider shaft 152 and the pinion gear 164 to facilitate rotation of the pinion gear 164 with respect to the spider shaft 152. Each pinion gear 164 may include a set of teeth that mate with teeth on the first side gear 160 and teeth on the second side gear 162. As such, the pinion gears 164 may be in meshing engagement with the first side gear 160 and the second side gear 162. The first spider retainer 44, the second spider retainer 46, or both may encircle the pinion gears 164.

Referring to FIGS. 2 and 4, a thrust washer 166 may be provided between a pinion gear 164 and the first and second spider retainers 44, 46. The thrust washer 166 may encircle the spider shaft 152 and may extend from the pinion gear 164 in a direction that extends away from the axis 30. For instance, the thrust washer 166 may extend from the pinion gear 164 to the washer 168.

A washer 168 may be provided between the thrust washer 166 and the first and second spider retainers 44, 46. A washer 168 may encircle the spider shaft 152 and may extend from the thrust washer 166 in a direction that extends away from the axis 30. For instance, the washer 168 may extend from the thrust washer 166 to the first spider retainer 44, the second spider retainer 46, or both.

Referring to FIG. 4, the seal 52 may be provided between the hub 40 and the hub cap 42. The seal 52 may encircle the axis 30 and may extend from the hub 40 to the hub cap 42. For instance, the seal 52 may extend from the hub flange end surface 70 to the hub cap flange end surface 110. The seal 52 may be of any suitable type. For instance, the seal 52 may be an O-ring, gasket, sealant, such as a silicone sealant, or the like.

A wheel end assembly as described above may be leak resistant. This may be accomplished by enclosing the spider and its spider shafts inside the internal cavity that is defined by the hub and the hub cap rather than by providing spider shaft holes as through holes in the hub, the hub cap, or both. Such a configuration eliminates a potential leak path and may help reduce manufacturing costs as spider shaft holes that extend from the exterior of a wheel hub assembly need to be manufactured with tight tolerances. For instance, corner chamfers and edge braking of corner chamfers need to be precisely controlled to avoid leaks between the hub and the hub cap. In addition, the present invention does not require that sealant be provided in the spider shaft holes where the sealant can potentially enter the gear reduction unit and affect operational performance. The seal provided between the hub and the hub cap in the present invention is separated from the gear reduction module by the first and second spider retainers, which helps prevent sealant from entering the gear reduction module. Seals or O-rings around spider shafts may be eliminated, which may help further reduce costs and potential misassembly. The present invention eliminates machining operations associated with providing spider shaft holes in the hub and/or the hub cap which helps reduce manufacturing costs.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A wheel end assembly comprising:
 a hub that is rotatable about an axis;
 a hub cap that is mounted to the hub, wherein the hub and the hub cap cooperate to define an internal cavity;
 a first spider retainer that encircles the axis and is disposed in the internal cavity;
 a second spider retainer that encircles the axis and is disposed in the internal cavity, wherein the first spider retainer and the second spider retainer cooperate to define a spider shaft hole, wherein the second spider retainer is fastened to the hub such that the hub and the second spider retainer are rotatable together about the axis, and the hub cap, the first spider retainer, the second spider retainer, and the hub are fastened together with a fastener that extends through the hub cap, through the first spider retainer, through the second spider retainer, and into the hub; and a spider that has a spider shaft that is disposed between the first spider retainer and the second spider retainer and received in the spider shaft hole, wherein an end surface of the spider shaft that faces away from the axis is disposed inside the internal cavity.

2. The wheel end assembly of claim 1 wherein the first spider retainer is encircled by the hub cap.

3. The wheel end assembly of claim 1 wherein the second spider retainer is encircled by the hub.

4. The wheel end assembly of claim 1 wherein the hub cap encircles the first spider retainer and the hub encircles the second spider retainer.

5. The wheel end assembly of claim 1 wherein the first spider retainer engages the hub cap.

6. The wheel end assembly of claim 1 wherein the second spider retainer engages the hub.

7. The wheel end assembly of claim 1 wherein the first spider retainer is fastened to the second spider retainer such that the first spider retainer and the second spider retainer are rotatable together about the axis.

8. The wheel end assembly of claim 1 wherein the first spider retainer is fastened to the hub cap such that the hub cap and the first spider retainer are rotatable together about the axis.

9. The wheel end assembly of claim 1 wherein the second spider retainer is fastened to the hub such that the hub and the second spider retainer are rotatable together about the axis.

10. The wheel end assembly of claim 1 wherein the first spider retainer and the second spider retainer encircle a gear reduction unit.

11. The wheel end assembly of claim 10 wherein the gear reduction unit includes a pinion gear that is rotatable about the spider shaft and the first spider retainer and the second spider retainer encircle the pinion gear.

12. The wheel end assembly of claim 11 wherein a thrust washer and a washer encircle the spider shaft, the thrust washer extends from the pinion gear to the washer, and the washer extends from the thrust washer to the first spider retainer and the second spider retainer.

13. The wheel end assembly of claim 1 further comprising a seal that extends from the hub to the hub cap and that encircles the axis.

14. A wheel end assembly comprising:
a hub that is rotatable about an axis;
a hub cap that engages the hub and comprises a hub cap wall, wherein the hub and the hub cap cooperate to define an internal cavity;
a first spider retainer that is disposed in the internal cavity and that engages the hub cap, wherein the hub cap wall faces toward the first spider retainer and the hub, and the first spider retainer engages the hub cap wall;
a second spider retainer that is disposed in the internal cavity and that engages the hub, wherein the first spider retainer and the second spider retainer are sandwiched between the hub and the hub cap and the first spider retainer and the second spider retainer cooperate to define a spider shaft hole; and
a spider that has a spider shaft that is sandwiched between the first spider retainer and the second spider retainer and that is received in the spider shaft hole, wherein the spider, the first spider retainer, and the second spider retainer are completely disposed inside the internal cavity.

15. The wheel end assembly of claim 14 wherein the hub cap, the first spider retainer, the second spider retainer, and the hub are fastened together and are rotatable together about the axis.

16. The wheel end assembly of claim 14 wherein the hub cap has a hub cap flange that encircles the axis and has a hub cap flange end surface, the hub has a hub flange that encircles the axis and that extends to a hub flange end surface, and a seal extends from the hub cap flange end surface to the hub flange end surface.

17. The wheel end assembly of claim 16 wherein the first spider retainer engages the hub cap flange and the second spider retainer engages the hub flange.

18. A wheel end assembly comprising:
a hub that is rotatable about an axis and comprises a hub step;
a hub cap that engages the hub, wherein the hub and the hub cap cooperate to define an internal cavity;
a first spider retainer that is disposed in the internal cavity and that engages the hub cap;
a second spider retainer that is disposed in the internal cavity and that engages the hub, wherein the first spider retainer and the second spider retainer are sandwiched between the hub and the hub cap and the first spider retainer and the second spider retainer cooperate to define a spider shaft hole; and
a spider that has a spider shaft that is sandwiched between the first spider retainer and the second spider retainer and that is received in the spider shaft hole, wherein the spider, the first spider retainer, and the second spider retainer are completely disposed inside the internal cavity, wherein the hub step faces toward the second spider retainer and the hub cap, and the second spider retainer engages the hub step.

19. The wheel end assembly of claim 18 wherein the hub cap, the first spider retainer, the second spider retainer, and the hub are fastened together with a fastener that extends through the hub cap, through the first spider retainer, through the second spider retainer, and into the hub.

20. The wheel end assembly of claim 18 wherein the hub cap has a hub cap wall that faces toward the first spider retainer and the hub, wherein the first spider retainer engages the hub cap wall.

* * * * *